July 12, 1966 R. HAPPE ETAL 3,260,290
ATTACHMENT FOR SABRE SAW FOR FLUSH CUTTING AND SIDE CUTTING
Filed April 16, 1964
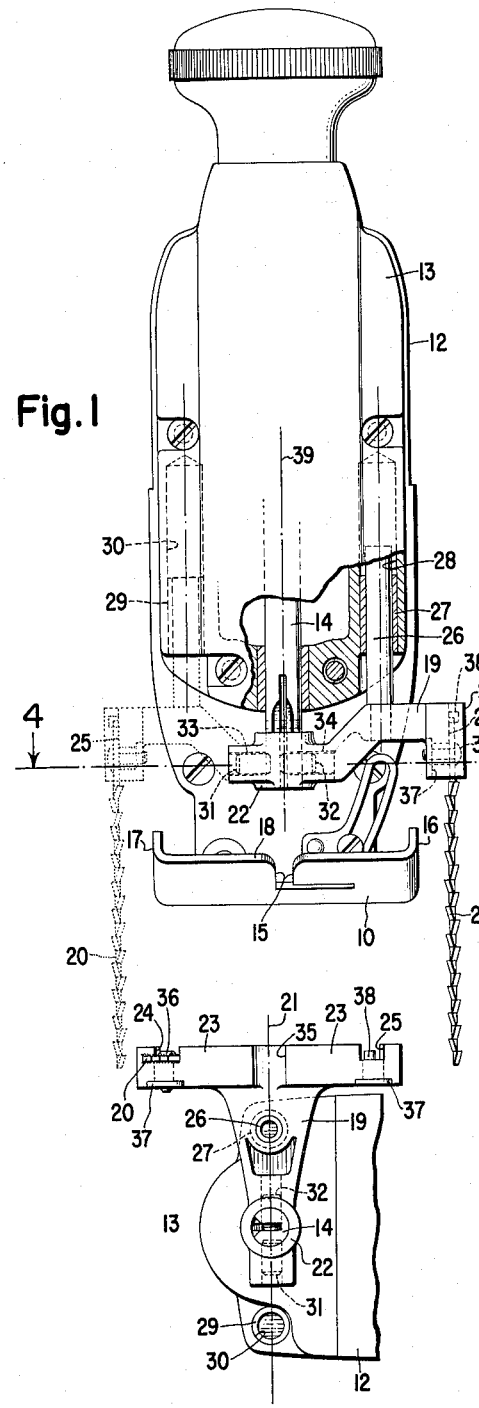
Fig.1　Fig.2
Fig.3
Fig.4
WITNESS
INVENTORS
Reynold Happe
Daniel M. Burris
BY 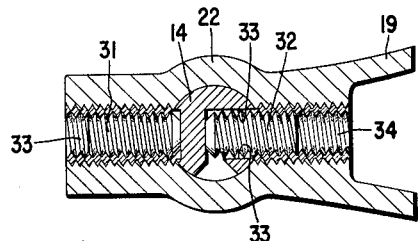
ATTORNEY United States Patent Office 3,260,290
Patented July 12, 1966

1

3,260,290
ATTACHMENT FOR SABRE SAW FOR FLUSH CUTTING AND SIDE CUTTING
Reynold Happe, Greenville, and Daniel M. Burris, Anderson, S.C., assignors to The Singer Company, New York, N.Y., a corporation of New Jersey
Filed Apr. 16, 1964, Ser. No. 360,374
5 Claims. (Cl. 143—68)

This invention relates to blade-holding attachments for powered sabre saws which permit such saws to cut as closely as desired to a side surface and fully into an inside corner defined by vertical wall portions.

In the conventional sabre saw it is customary, in order to secure adequate stability, to position the cutting edge of the saw blade some distance behind the front of the saw base plate and inwardly from the sides of said base plate. This situation, while desirable for most cuts, makes it impossible to make a special cut right up flush to a front wall or other vertical surface or to cut close to a vertical side surface without use of a special blade or an offset attachment.

Such special blades and attachments have, in general, been unsatisfactory either because they are not sufficiently rigid to enable accurate offset cutting to a predetermined line or because the blade-supporting structure to obtain the requisite rigidity has heretofore been bulky and complex and has required a special housing extension, which, in effect, destroys the versatility of the tool.

What has been needed is an attachment for a sabre saw to make it useful for cutting flush to adjacent surfaces and having such inherent rigidity as to render the structure simple in itself and easy to attach to the common sabre saw without the necessity of using any additional base extensions or any similar special supporting structure.

The present invention provides an attachment for a sabre saw having the above desired advantages. This is accomplished by utilizing a blade-holding member having a guide rod which may be placed in selective sliding engagement with either one of two auxiliary guide means on the sabre saw to effect a new operative position for the saw blade selectively offset to the right or to the left beyond the lateral edges of and, if desired, forwardly of the base plate. With this auxiliary guiding structure the saw blade is firmly held to reciprocate along a new line accurately parallel to but offset from the saw bar axis and does not therefore depend on material bulk to supply the requisite rigidity.

It is an object of this invention therefore to provide an attachment for a sabre saw to permit selective flush and side cutting without requiring any modification of the supporting base plate.

It is a further object of this invention to provide an offset saw-blade holding attachment for a sabre saw which utilizes auxiliary guiding means to maintain close parallelism between the offset line of blade reciprocations and the saw bar axis.

It is a still further object of this invention to provide a blade-holding attachment for a sabre saw, which attachment has a single guide rod for selective sliding engagement with one of two guideways on the saw to effect a selected operative position of the saw blade offset to the right or to the left and beyond the lateral edges of the base plate.

With the above and other objects in view, as will hereinafter appear, the invention comprises the devices, combinations and arrangements of parts hereinafter set forth and illustrated in the accompanying drawings of the preferred embodiment of the invention, from which the several features of the invention and the advantages attained thereby will be readily understood by those skilled in the art.

2

In the drawings:
FIG. 1 is a front-end elevation, partly in section. of a sabre saw showing the attachment in place in accordance with one embodiment of the invention.
FIG. 2 is a side elevation of the sabre saw of FIG. 1, with a partial section to show the guide means for the attachment.
FIG. 3 is a bottom plan of the sabre saw of FIG. 1.
FIG. 4 is a detailed section taken substantially on line 4—4 of FIG. 1 to show the manner of securing the attachment to the saw-bar.

Referring to FIG. 1 and FIG. 2, there is shown a sabre saw having a base plate 10, a motor housing 11, a gear housing 12 and a cover 13. Journaled in the cover 13 for vertical reciprocatory motion in a line 39 substantially normal to the base plate 10 is a saw bar 14. In normal use, a saw blade (not shown) is secured to the lower end of the saw bar 14 and extends downwardly through a slot 15 in the base plate 10. It will be seen that, with the saw blade in this position, cuts cannot be made close to vertical side surfaces due to interference with the side edges 16 and 17 of the base plate 10. By the same token, cuts cannot be made flush with a vertical forward surface because of interference with the forward end 18 of the base plate 10.

To increase its versatility and adapt the ordinary sabre saw for making such side and flush cuts as mentioned above, it is proposed, according to this invention, to utilize a simple blade-holding attachment 19 which may be readily secured to the saw bar 14 in place of the normally used saw blade, said attachment then affording a new operative position for the saw blade 20 parallel to its old position but offset selectively to the right or to the left of the base plate 10 as shown in FIG. 1 and, if desired, also offset to a position in front of the base plate 10, as seen in FIG. 2.

As seen best in FIG. 3, the attachment 19, preferably a casting shown in bottom plan, has an axis of symmetry 21. Located at one end of the attachment 19 and on the axis 21 is an apertured hub portion 22 adapted to embrace the end of the saw bar 14 as shown.

The opposite end of the attachment 19 is formed with laterally extended limbs 23 having blade-receiving slots 24, 25 formed in the end surface thereof, said slots being located symmetrically on opposite sides of the axis 21 as viewed in FIG. 3.

Secured to and forming part of the attachment 19 is an upstanding guide rod 26 as seen best in FIGS. 1 and 2. The rod 26 is secured by brazing or any suitable means to member 19 at a point on the axis of symmetry 21 and stands in a position normal to said axis 21 between the hub end and the blade-receiving end thereof, as shown in FIG. 3. Rod 26 is received in sliding engagement within a bushing 27 fitted within a bore 28 made in the cover 13. The common axis of bushing 27 and bore 28 is made parallel to the line of motion 39 of the saw bar 14. There is a similar bushing 29 and bore 30 located symmetrically on the other side of the saw bar 14 in the cover 13. If the member 19 is rotated about the saw bar 14 from the position shown in the full lines of FIG. 1 to the position shown in the dotted lines and the saw blade 20 is secured within the slot 25, then side cuts may be also made on the opposite side of the base plate 10. This permits the ordinary sabre saw to be used to make cuts close to vertical surfaces to the right and to the left of the saw and fully into an inside corner.

While any suitable means may be used to removably secure the attachment 19 to the saw bar 14, there is shown in FIG. 4 an embodiment using two set screws 31 and 32 threaded into threaded inserts 33 and 34 in diametrically opposite sides of the hub portion 22. For gauging the proper position along the saw bar 14, the set screw 32 may engage the lateral aperture 33 in the bar 14 as shown in FIG. 4. It will be seen from FIGS. 1 and 2 that access to set screw 32 is gained through a slotted portion 35.

The saw blade 20 may be removably secured in slots 24 or 25 by a headed screw 36 threaded into inserts 37, with gauging performed by stop pins 38 which engage the shank end of the blade 20 as shown in FIG. 2.

It will be seen from the above that the engagement of the apertured hub 22 with the saw-bar 14 and the guide rod 26 with the bushing 27 or 29 provide two accurately and easily repeatable selective positions for the saw blade 20 for flush and side cutting and with no necessary modification to the base plate. It will also be observed that the guiding feature of the attachment supplied by the guide rod 26 affords a stable support for the saw-blade in its offset position which resists any bending or turning which would adversely affect its proper and permanent alignment with the saw bar axis.

Having thus described the nature of this invention, what we claim herein is:

1. An attachment for a sabre saw of the type having a saw bar mounted for reciprocatory motion in a line substantailly normal to a work-contacting base plate and having auxiliary guide means paralleling said line of motion, comprising: a blade-holding member, an apertured hub portion formed on one end of said member for mounting said member on the saw bar, saw-blade receiving means formed in the opposite end of said member, and means formed on said blade-holding member between said apertured hub portion and said saw-blade receiving means for cooperative guiding engagement with said auxiliary guide means.

2. An attachment for a sabre saw of the type having a saw bar mounted for reciprocatory motion in a line sub- substantially normal to a work-contacting base plate and having auxiliary guide means paralleling said line of motion, comprising: a blade-holding member, an apertured hub portion formed on one end of said member for mounting said member on the saw bar, saw-blade receiving means formed in the opposite end of said member, and an upstanding guide rod secured to said blade-holding member between said apertured hub portion and said saw-blade receiving means for cooperative sliding engagement with said auxiliary guide means.

3. An attachment for a sabre saw of the type having a saw bar mounted for reciprocatory motion in a line substantially normal to a work-contacting base plate and having auxiliary guide means paralleling said line of motion, comprising: a blade-holding member having an axis of symmetry, an apertured hub portion located on said axis and formed on one end of said member for mounting said member on the saw bar, saw-blade receiving slots formed in the opposite end of said member and located on both sides of said axis of symmetry, and an upstanding guide rod secured to said blade-holding member on the axis of symmetry between said apertured hub and said slots for cooperative sliding engagement with said auxiliary guide means.

4. An attachment for a sabre saw of the type having a saw bar mounted for reciprocatory motion in a line substantially normal to a work-contacting base plate and having separate spaced auxiliary guide means paralleling said line of motion, comprising: a blade-holding member having an axis of symmetry, an apertured hub portion located on said axis and formed on one end of said member for mounting said member on the saw bar, saw-blade receiving means formed in the opposite end of said member and spaced equally on both sides of said axis of symmetry, and an upstanding guide rod secured to said blade-holding member on the axis of symmetry between said apertured hub and said saw-blade receiving means for cooperative sliding engagement with a selected one of said auxiliary guide means.

5. An attachment for a sabre saw of the type having a saw bar mounted for reciprocatory motion in a line substantially normal to a work-contacting base plate and having guideways parallel to and spaced equally on both sides of said line of motion, comprising: a blade-holding member having an axis of symmetry, an apertured hub portion located on said axis and formed on one end of said member for mounting said member on the saw bar, saw-blade receiving means formed in the opposite end of said member and spaced equally on both sides of said axis of symmetry, and a guide rod secured to said blade-holding member to stand in a position normal to said axis of symmetry, said guide rod being in sliding engagement with a selected one of said guideways when said blade-holding member is mounted on said saw bar.

References Cited by the Examiner

UNITED STATES PATENTS

| | | | |
|---|---|---|---|
| 2,588,477 | 3/1952 | Briggs | 143—68 |
| 2,954,808 | 10/1960 | Sweeney et al. | 143—68 |

DONALD R. SCHRAN, *Primary Examiner.*